United States Patent
Null

(10) Patent No.: US 7,345,106 B2
(45) Date of Patent: Mar. 18, 2008

(54) COMPOSITION COMPRISING EPDM AND A PARAFFINIC OIL

(75) Inventor: Volker Klaus Null, Hamburg (DE)

(73) Assignee: Shell Oil Company, Houston, TX (US)

( * ) Notice: Subject to any disclaimer, the term of this patent is extended or adjusted under 35 U.S.C. 154(b) by 29 days.

(21) Appl. No.: 10/521,698

(22) PCT Filed: Jul. 16, 2003

(86) PCT No.: PCT/EP03/08063

§ 371 (c)(1),
(2), (4) Date: Jan. 19, 2005

(87) PCT Pub. No.: WO2004/009699

PCT Pub. Date: Jan. 29, 2004

(65) Prior Publication Data

US 2005/0250894 A1 Nov. 10, 2005

(30) Foreign Application Priority Data

Jul. 19, 2002 (EP) .................................. 02016087

(51) Int. Cl.
*C08K 5/01* (2006.01)
*C08L 53/00* (2006.01)

(52) U.S. Cl. ................. 524/474; 524/515; 524/570

(58) Field of Classification Search ............... 524/515, 524/570, 474
See application file for complete search history.

(56) References Cited

U.S. PATENT DOCUMENTS

| | | | |
|---|---|---|---|
| 3,102,098 A | 8/1963 | Metro et al. ................. 252/56 |
| 4,134,870 A | 1/1979 | Makowski et al. ......... 260/28.5 |
| 4,208,310 A | 6/1980 | Lundberg et al. ....... 260/23.5 A |
| 4,574,043 A | 3/1986 | Chester et al. ................. 208/59 |
| 4,859,311 A | 8/1989 | Miller ........................... 208/89 |
| 4,943,672 A * | 7/1990 | Hamner et al. .............. 585/737 |
| 5,053,373 A | 10/1991 | Zones .......................... 502/64 |
| 5,059,299 A | 10/1991 | Cody et al. ................... 208/27 |
| 5,157,191 A | 10/1992 | Bowes et al. ................ 585/533 |
| 5,242,971 A * | 9/1993 | Nakahama et al. .......... 524/526 |
| 5,252,527 A | 10/1993 | Zones .......................... 502/64 |
| 5,290,886 A | 3/1994 | Ellul ........................... 524/515 |
| 6,332,974 B1 | 12/2001 | Wittenbrink et al. .......... 208/18 |

FOREIGN PATENT DOCUMENTS

| | | |
|---|---|---|
| AU | 698392 | 10/1998 |
| EP | 0 532 118 | 3/1993 |
| EP | 0 577 255 | 1/1994 |
| EP | 0 668 342 | 8/1995 |
| EP | 0 776 959 | 6/1997 |
| EP | 0 832 171 | 4/1998 |
| EP | 0855426 | 7/1998 |
| EP | 1 028 145 | 8/2000 |
| EP | 1 132 242 | 9/2001 |
| GB | 155020 | 12/1920 |
| WO | 94/10263 | 5/1994 |
| WO | 97/18278 | 5/1997 |
| WO | 99/20720 | 4/1999 |
| WO | 99/34917 | 7/1999 |
| WO | 00/14179 | 3/2000 |
| WO | 00/29511 | 5/2000 |
| WO | 01/46339 | 6/2001 |
| WO | WO0149761 | 7/2001 |

OTHER PUBLICATIONS

International Search Report dated Oct. 17, 2003.

* cited by examiner

*Primary Examiner*—Kriellion Sanders

(57) ABSTRACT

The invention relates to a composition having a ethylene-propylene-diene rubber component and a Fischer-Tropsch derived process oil. The process oil preferably has a flash point of above 260° C. and an evaporation loss at 107° C. during 22 hours of less than 0.05 wt %.

22 Claims, No Drawings

COMPOSITION COMPRISING EPDM AND A PARAFFINIC OIL

PRIORITY CLAIM

The present application claims priority on European Patent Application 02016087.5 filed 19 Jul. 2002.

FIELD OF THE INVENTION

The invention is related to a composition comprising an ethylene-propylene-diene (EPDM) rubber component and a paraffinic oil component.

BACKGROUND OF THE INVENTION

Such EPDM containing compositions are well known and are described in detail in Rubber Technology Handbook, Werner Hofmann, Oxford University Press, New York, 1980, paragraph 3.3.8, pages 93-100. Paraffinic oils are used as platicisers or softening agents in such compositions. Also compositions often referred to as thermoplastic elastomers (TPE) or also sometimes referred to as thermoplastic vulcanisates (TPV) as described in said Handbook on pages 144-150 and 154-156 comprising EPDM and a polypropylene may comprise paraffinic process oils. Examples of such compositions may be found in EP-A-1132242, GB-A-155020, U.S. Pat. No. 5,290,886 and EP-A-1028145.

The paraffinic oils commonly used in such applications are either hydroprocessed petroleum derived oils, such as the Paralux oils as supplied by Chevron Products Company or synthetic paraffin oils, for example poly-alpha olefins such as a low weight component of Poly-ethylene-propylene such as described in EP-A-1028145.

U.S. Pat. No. 4,208,310 and U.S. Pat. No. 4,134,870 describe an elastomer composition containing a paraffinic wax, which according to the description may be a Fischer-Tropsch derived wax The addition of the wax, which is solid at room temperature, results improved physical and rheological properties. EP-A-577255 describes an EPDM composition which contains an extender oil and a crystalline paraffin wax. The crystalline wax may be prepared by a Fischer-Tropsch process. The paraffinic wax has a melting point of between 60 and 100° C. and is thus solid at room temperature.

Compositions as described above are often used in automotive applications, such as parts of the interior of the automobile. There is an increasing demand for low hydrocarbon emissions of an automobile. These hydrocarbon emissions are measured by keeping a complete car at an elevated temperature and detecting any hydrocarbon emissions. In view of this development there is an increasing demand for EPDM containing compositions having a low hydrocarbon emission.

SUMMARY OF THE INVENTION.

The invention is directed to a composition comprising an ethylene-pronylene-diene rubber component; and, a process oil having a kinematic viscosity at 100° C. greater than 8 cSt and a pour point of below 10° C. wherein the process oil is obtained by a process comprising:
(a) hydrocracking/hydroisomerizing a feed comprising a Fischer-Tronsch synthesis product;
(b) isolating from the product of step (a) a process oil precursor fraction; and,
(c) dewaxing the process oil precursor fraction obtained in step (b) to obtain the process oil.

DETAILED DESCRIPTION OF THE INVENTION

Applicants have found that a process oil as derived from a Fischer-Tropsch synthesis product can be simply obtained having properties which lower the hydrocarbon emissions of the finished EPDM comprising product. Some severely hydroprocessed or synthetic paraffinic process oils as described above may hydroprocessed oils is that the low temperature properties for the higher viscosity grade oils is much better making the Fischer-Tropsch derived oils easier to handle in the process of making the EDPM containing product.

The Fischer-Tropsch derived oil preferably has a flash point according to ISO 2592 of above 240° C. and more preferably above 260° C. The UV adsorption of the oil at 300 nm is preferably less than 1% and more preferably less than 0.6% according to ASTM D 2008-A1. The evaporation loss at 107° C. during 22 hours of the oil (according to ASTM D 972 is preferably less than 0.1 wt % and more preferably less than 0.05 wt %.

The kinematic viscosity at 100° C. of the oil will be result from the above requirements and will be above 8 cSt and mere preferably above 9 cSt. The upper limit is not essential for the hydrocarbon emissions requirements. Nevertheless it is not advantageous to use oil that is too viscous for practical processing reasons. Preferably the upper limit will be around 30 cSt, preferably 25 cSt. The pour point of the process oil will be dependent on the viscosity grade used. Applicants have found a process involving a catalytic dewaxing step to prepare a FischerTropsch process oil having pour points ranging from −40° C. for the less viscous grades to around 10° C. for the more viscous grades. This has been found very advantageous because the oil can be used in a liquid state at ambient conditions during the manufacturing of the EPDM comprising composition. Applicants further found that the Fischer-Tropsch derived oil preferably has a CN number as measured according to IEC 590 of between 15 and 30%.

The process oil is preferably prepared using the below process, by
(a) hydrocrackin/hydroisomerizing a feed comprising a Fischer-Tropsch derived feed;
(b) isolating from the product of step (a) a process oil precursor fraction; and
(c) dewaxing the process oil precursor fraction obtained in step (b) to obtain the process oil, optionally after separating a lower boiling fraction from said dewaxed product.

The Fischer-Tropsch derived feed can be obtained by well-known processes, for example the so-called commercial Sasol process, the commercial Shell Middle Distillate Process or by the non-commercial Exxon process. These and other processes are for example described in more detail in EP-A-776959, EP-A-668342, U.S. Pat. No. 4,943,672, U.S. Pat. No. 5,059,299, WO-A-9934917 and WO-A-9920720 all of which are hereby incorporated by reference.

A preferred process to prepare the process oil having the desired flash point, evaporation loss and CN-number properties involves using a Fischer-Tropsch derived feed in step (a) wherein the weight ratio of compounds having at least 60 or more carbon atoms and compounds having at least 30 carbon atoms in the Fischer-Tropsch derived feed is at least 0.2 and wherein at least 30 wt % of compounds in the Fischer-Tropsch product have at least 30 carbon atoms.

More preferably, the feed has at least 50 wt % and most preferably at least 55 wt % of compounds having at least 30 carbon atoms. Furthennore, the weight ratio of compounds having at least 60 or more carbon atoms and compounds having at least 30 carbon atoms of the Fischer-Tropsch derived feed is preferably at least 0.4 and more preferably at least 0.55. The Fischer-Tropsch derived feed is preferably derived from a Fischer-Tropsch product which comprises a $C_{20}+$ fraction having an ASF-alpha value (Anderson-Schulz-Flory chain growth factor) of at least 0.925, preferably at least 0.935, more preferably at least 0.945, even more oreferablv at least 0.955.

The initial boiling point of the Fischer-Tropsch derived feed may range up to 400° C., but is preferably below 200° C. Preferably at least any compounds having 4 or less carbon atoms and any compounds having a boiling point in that range are separated from a Fischer-Tropsch synthesis product before the Fischer-Tropsch synthesis product is used as a Fischer-Tropsch derived feed in step (a). In addition to this Fischer-Tropsch product false other fractions may also be part of the Fischer-Tropsch derived feed. Possible other fractions may suitably be any high boiling fraction obtained in step (b).

Such a Fischer-Tropsch derived feed is suitably obtained by a Fischer-Tropsch process, which yields a relatively heavy Fischer-Tropsch product. Not all Fischer-Tropsch processes yield such a heavy product. An example of a suitable Fischer-Tropsch process is described in WO-A-9934917 and in AU-A-698392 hereby incorporated by reference. These processes may yield a Fischer-Tropsch product as described above.

The Fischer-Tropsch derived feed and the resulting waxy raffinate product will contain no or very little sulfur and nitrogen containing compounds. This is typical for a product derived from a Fischer-Tropsch reaction, which uses synthesis gas containing almost no impurities. Sulfur and nitrogen levels will generally be below the detection limits, which are currently 5 ppm for sulfur and 1 ppm for nitrogen.

The Fischer-Tropsch product may optionally be subjected to a mild hydrotreatment step in order to remove any oxygenates and saturate any olefinic compounds present in the reaction product of the Fischer-Tropsch reaction. Such a hydrotreatment is described in EP-B-668342. The mildness of the hydrotreating step is preferably expressed in that the degree of conversion in this step is less than 20 wt % and more preferably less than 10 wt %. The conversion is here defined as the weight percentage of the feed boiling above 370° C. that reacts to a fraction boiling below 370° C. After such a mild hydrotreatment lower boiling compounds, having three or less carbon atoms and other compounds boiling in that range, will preferably be removed from the effluent before it is used in step (a).

The hydrocrackin/hydroisomerization reaction of step (a) is preferably performed in the presence of hydrogen and a catalyst, which catalyst can be chosen from those known to one skilled in the art as being suitable for this reaction Catalysts for use in step (a) typically comprise an acidic functionality and a hydrogenation/dehydrogenation functionality. Preferred acidic functionalities are refractory metal oxide carriers. Suitable carrier materials include silica, alumina, silica-alumina, zirconia, titania and mixtures thereof. Preferred carrier materials for inclusion in the catalyst for use in the process of this invention are silica, alumina and silica-alumina. A particularly preferred catalyst comprises platinum supported on a silica-alumina carrier. If desired, the acidity of the catalyst carrier may be enhanced by applying a halogen moiety, in particular fluorine, or a phosphorous moiety to the carrier. Examples of suitable hydrocracking/hydroisomerization processes and suitable catalysts are described in WO-A-0014179, EP-A-532118 and the earlier referred to EP-A-776959 all of which are hereby incorvorated by reference.

Preferred hydrogenation/dehydrogenation functionalities are Group VIII metals, such as nickel, cobalt, iron, palladium and platinum. Preferred are the noble metal Group VIII members, palladium and more preferred platinum. The catalyst may comprise the more preferred noble metal hydrogenation/dehydrogenation active component in an amount of from 0.005 to 5 parts by weight, preferably from 0.02 to 2 parts by weight, per 100 parts by weight of carrier material. A particularly preferred catalyst for use in the hydroconversion stage comprises platinum in an amount in the range of from 0.05 to 2 parts by weight, more preferably from 0.1 to 1 parts by weight, per 100 parts by weight of carrier material. The catalyst may also comprise a binder to enhance the strength of the catalyst. The binder can be non-acidic. Examples are clays and other binders known to one skilled in the art.

In step (a) the feed is contacted with hydrogen in the presence of the catalyst at elevated temperature and pressure. The temperatures typically will be in the range of from 175 to 380° C., preferably higher than 250° C. and more preferably from 300 to 370° C. The pressure will typically be in the range of from 10 to 250 bar and preferably between 20 and 80 bar. Hydrogen may be supplied at a gas hourly space velocity of from 100 to 10000 Nl/l/hr, preferably from 500 to 5000 Nl/l/hr. The hydrocarbon feed may be provided at a weight hourly space velocity of from 0.1 to 5 kg/l/hr, preferably higher than 0.5 kg/l/hr and more preferably lower than 2 kg/l/hr. The ratio of hydrogen to hydrocarbon feed may range from 100 to 5000 Nl/kg and is preferably from 250 to 2500 Nl/kg.

The conversion in step (a) as defined as the weight percentage of the feed boiling above 370° C. which reacts per pass to a fraction boiling below 370° C., is at least 20 wt %, preferably at least 25 wt %, but preferably not more than 80 wt %, more preferably not more than 65 wt %. The feed as used above in the definition is the total hydrocarbon feed fed to step (a), thus also any optional recycle of the higher boiling fraction as obtained in step (b).

In step (b) the product of step (a) is preferably separated into one or more distillate fractions, a process oil precursor fraction, preferably having a T10 wt % boiling point of between 300 and 450° C. A heavy fraction may be separated from the product of step (a) to adjust the resultant viscosity of the process oil. If no heavy fraction is removed the kinematic viscosity at 100° C. of the process oil may be well above 15 cSt. By adjusting the amount and cut point at which the said heavy fraction is separated from the effluent of step (a) process oils can be obtained having a kinematic viscosity at 100° C. ranging from 8 cSt to above 25 cSt.

In step (c) the process oil precursor fraction. obtained in step (b) is subjected to a dewaxing treatment wherein the pour point of the oil is reduced. The pour point is preferably reduced by more than 10° C.

Dewaxing can be performed by means of a so-called solvent dewaxing process or by means of a catalytic dewaxing process.

Solvent dewaxing is well known to those skilled in the art and involves admixture of one or more solvents and/or wax precipitating agents with the process oil precursor fraction and cooling the mixture to a temperature in the range of from –10° C. to –40° C., preferably in the range of from –20° C. to –35° C., to separate the wax from the oil. The oil containing the wax is usually filtered through a filter cloth which can be made of textile fibres, such as cotton; porous metal cloth; or cloth made of synthetic materials. Examples of solvents which may be employed in the solvent dewaxing process are $C_3$-$C_6$ ketones (e.g. methyl ethyl ketone, methyl isobutyl ketone and mixtures thereof), $C_6$-$C_{10}$ aromatic hydrocarbons (e.g. toluene), mixtures of ketones and aromatics (e.g. methyl ethyl ketone and toluene), autorefrigerative solvents such as liquefied, normally gaseous $C_2$-$C_4$ hydrocarbons such as propane, propylene, butane, butylene and mixtures thereof. Mixtures of methyl ethyl ketone and toluene or methyl ethyl ketone and methyl isobutyl ketone are generally preferred. Examples of these and other suitable solvent dewaxing processes are described in Lubricant Base Oil and Wax Processing, Avilino Sequeira, Jr, Marcel Dekker Inc., New York, 1994, Chapter 7.

Preferably step (c) is performed by means of a catalytic dewaxing process. The catalytic dewaxing process can be performed by any process wherein in the presence of a catalyst and hydrogen the pour point of the process oil precursor fraction is reduced as specified above. Suitable dewaxing catalysts are heterogeneous catalysts comprising a molecular sieve and optionally in combination with a metal having a hydrogenation function, such as the Group VIII metals. Molecular sieves, and more suitably intermediate pore size zeolites, have shown a good catalytic ability to reduce the pour point of the process oil precursor fraction under catalytic dewaxing conditions. Preferably the intermediate pore size zeolites have a pore diameter of between 0.35 and 0.8 nm. Suitable intermediate pore size zeolites are mordenite, ZSM-5, ZSM-12, ZSM-22, ZSM-23, SSZ-32, ZSM-35 and ZSM-48. Another preferred group of molecular sieves are the silica-aluminaphosphate (SAPO) materials of which SAPO-11 is most preferred as for example described in U.S. Pat. No. 4,859,311. ZSM-5 may optionally be used in its HZSM-5 form in the absence of any Group VIII metal. The other molecular sieves are preferably used in combination with an added Group VIII metal. Suitable Group VIII metals are nickel, cobalt, platinum and palladium. Examples of possible combinations are Ni/ZSM-5, Pt/ZSM-23, Pd/ZSM-23, Pt/ZSM-48 and Pt/SAPO-11. Further details and examples of suitable molecular sieves and dewaxing conditions are for example described in WO-A-9718278, U.S. Pat. No. 5,053,373, U.S. Pat. No. 5,252,527 and U.S. Pat. No. 4,574,043 all of which are hereby incorporated by reference.

The dewaxing catalyst suitably also comprises a binder. The binder can be a synthetic or naturally occurring (inorganic) substance, for example clay, silica and/or metal oxides. Natural occurring clays are for example of the montmorillonite and kaolin families. The binder is preferably a porous binder material, for example a refractory oxide of which examples are: alumina, silica-alumina, silica-magnesia, silica-zirconia, silica-thoria, silica-beryllia, silica-titania as well as ternary compositions for example silica-alumina-thoria, silica-alumina-zirconia, silica-alumina-magnesia and silica-magnesia-zirconia. More preferably a low acidity refractory oxide binder material, which is essentially free of alumina, is used. Examples of these binder materials are silica, zirconia, titanium dioxide, germanium-dioxide, boria and mixtures of two or more of these of which examples are listed above. The most preferred binder is silica.

A preferred class of dewaxing catalysts comprise intermediate zeolite ciystallites as described above and a low acidity refractoiy oxide binder material which is essentially free of alumina as described above, wherein the surface of the aluminosilicate zeolite crystallites has been modified by subjecting the aluminosilicate zeolite crystallites to a surface dealumination treatment. A preferred dealumination treatment is by contacting an extrudate of the binder and the zeolite with an aqueous solution of a fluorosilicate salt as described in for example U.S. Pat. No. 5,157,191 or WO-A-0029511. Examples of suitable dewaxing catalysts as described above are silica bound and dealuminated Pt/ZSM-5, silica bound and dealuminated Pt/ZSM-23, silica bound and dealuminated Pt/ZSM-112, silica bound and dealuminated Pt/ZSM-22, as for example described in WO-A-00295 11 and EP-B-832171.

Catalytic dewaxing conditions are known in the art and typically involve operating temperatures in the range of from 200° C. to 500° C., suitably from 250° C. to 400° C., hydrogen pressures in the range of from 10 bar to 200 bar, preferably from 40 bar to 70 bar, weight hourly space velocities (WHSV) in the range of from 0.1 to 10 kg of oil per litre of catalyst per hour (kg/l/hr), suitably from 0.2 to 5 kg/l/hr. more suitably from 0.5 to 3 kg/l/hr and hydrogen to oil ratios in the range of from 100 to 2,000 litres of hydrogen per litre of oil. By varying the temperature between 315° C. and 375° C. at between 40-70 bars, in the catalytic dewaxing step it is possible to prepare base oils having different pour point specifications varying from suitably −10° C.o−60° C.

Optionally a lower boiling fraction is separated from the oil as obtained after dewaxing. The need to separate a fraction will be determined by the properties of the process oil precursor fraction used in step (c) and the dewaxing process used. For example, a catalytic dewaxing step will suitably require such a separation because lower boiling fractions are formed in the dewaxing process which need to be removed in order to achieve the volatility requirements of the process oil used in the present invention.

The process oil may be subjected to a hydrofinishing step or an adsorption step in order to improve its color properties. Adsorption may be performed by contacting the oil with a suitable heterogeneous adsorbents, for example active carbon, zeolites, for example natural faujasite, or synthetic materials such as ferrierite, ZSM-5, faujasite, mordenite, metal oxides such as silica powder, silica gel, aluminium oxyde and various clays, for example Attapulgus clay (hydrous magnesium-aluminium silicate), Porocel clay (hydrated aluminium oxide). A preferred adsorbent is activated carbon.

A hydrofinishing step is suitably carried out at a temperature between 180° C. and 380° C., a total pressure of between 10 bar to 250 bar and preferably above 100 bar and more preferably between 120 bar and 250 bar. The WHSV (Weight hourly space velocity) ranges from 0.3 to 2 kg of oil per litre of catalyst per hour (kg/l/h).

The hydrogenation catalyst is suitably a supported catalyst comprising a dispersed Group VIII metal. Possible Group VIII metals are cobalt, nickel, palladium and platinum. Cobalt and nickel containing catalysts may also comprise a Group VIB metal, suitably molybdenum and tungsten. Suitable carrier or support materials are amorphous refractory oxides. Examples of suitable amorphous refractory oxides include inorganic oxides, such as alumina, silica, titania, zirconia, boria, silica-alumina, fluorided alumina, fluorided silica-alumina and mixtures of two or more of these.

Examples of suitable hydrogenation catalysts are nickel-molybdenum containing catalyst such as KF-847 and KF-8010 (AKZO Nobel) M-8-24 and M-8-25 (BASF), and C-424, DN-190, HDS-3 and HDS-4 (Criterion); nickel-tungsten containing catalysts such as NI-4342 and NI-4352

(Engelhard) and C-454 (Criterion); cobalt-molybdenum containing catalysts such as KF-330 (AKZO-Nobel), HDS-22 (Criterion) and HPC-601 (Engelhard). Preferably platinum containing and more preferably platinum and palladium containing catalysts are used. Preferred supports for these palladium and/or platinum containing catalysts are amorphous silica-alumina. Examples of suitable silica-alumina carriers are disclosed in WO-A-9410263. A preferred catalyst comprises an alloy of palladium and platinum preferably supported on an amorphous silica-alumina carrier of which the commercially available catalyst C-624 and C-654 of Criterion Catalyst Company (Houston, Tex.) are examples.

The content of the Fischer-Tropsch derived paraffinic process oil in the composition according to the present invention will depend on the desired properties of the end product and on the other components of the composition. The oil is usually applied as plasticizer. Typical ranges are mentioned in the above referred to patent applications. Typically the content of the paraffinic process oil may be between 1 and 60 wt % of the composition.

The composition may have the same composition as a commercial EPDM rubber wherein as the paraffinic oil the Fischer-Tropsch derived process oil is present. Examples of commercial EPDM rubbers are the KELTAN EPDM rubbers from DSM Elastomers, the VISTALON EPDM rubbers from ExxonMobil Chemical and DUTRAL EPDM rubbers from Enichem. (KELTAN, VISTALON, DUTRAL are trademarks)

The composition may also be a thermoplastic vulcanisate composition comprising an ethylene-propylene-diene rubber component and a poly-olefin component. The poly-alpha olefin is preferably polypropylene. Such compositions combines the elastic properties of a rubber with the processing characteristics of a thermoplast. The composition comprises preferably EPDM particles embedded in a polypropylene (PP) matrix. The PP phase presents the processing behaviour of aPP, while the cured EPDM rubber provides excellent elastic properties. The composition may have the same composition as a commercial TPE composition, wherein as the paraffinic oil the Fischer-Tropsch derived process oil is present. Example of commercial thermoplastic vulcanisate are the KELTAN EPDM or SARLINK TPV series from DSM Elastomers. (SARLINK is a trademark)

The below example will illustrate the preparation of a Fischer-Tropsch process oil having the desired properties for use in a composition according to the invention.

EXAMPLE 1

The $C_5$-$C_{750°C.}$+ fraction of the Fischer-Tropsch product, as obtained in Example VII using the catalyst of Example III of WO-A-9934917, was continuously fed to a hydrocracking step (step (a)). The feed contained about 60 wt % C30+ product. The ratio $C_{60+}/C_{30+}$ was about 0.55. In the hydrocracking step the fraction was contacted with a hydrocracking catalyst of Example 1 of EP-A-532118. The effluent of step (a) was continuously distilled under vacuum to give lights, fuels and a residue "R" boiling from 370° C. and above. The yield of gas oil fraction on fresh feed to hydrocracking step was 43 wt %. The properties of the gas oil thus obtained are presented in Table 3.

The main part of the residue "R" was recycled to step (a) and a remaining part was sent to a catalytic dewaxing step (c). The conditions in the hydrocracking step (a) were: a fresh feed Weight Hourly Space Velocity (WHSV) of 0.8 kg/l.h, recycle feed WHSV of 0.25 kg/l.h, hydrogen gas rate=1000 Nl/kg, total pressure=40 bar, and a reactor temperature of 335° C.

In the dewaxing step, the fraction described above boiling from 370° C. to above 750° C. was contacted with a dealuminated silica bound ZSM-5 catalyst comprising 0.7% by weight Pt and 30 wt % ZSM-5 as described in Example 9 of WO-A-0029511. The dewaxing conditions were 40 bar hydrogen, WHSV=1 kg/l.h and a temperature of 365° C.

The dewaxed oil was distilled into a process oil fraction boiling above 510° C. and a fraction boiling below said fraction. The yield of process oil based on feed to dewaxing step was 27.9 wt %. The process oil (Process oil-1) was analyzed in more detail and the properties are listed in Table 1.

EXAMPLE 2

A Shell MDS Waxy raffinate was contacted with a dealuminated silica bound ZSM-5 catalyst comprising 0.7% by weight Pt and 30 wt % ZSM-5 as described in Example 9 of WO-A-0029511. The dewaxing conditions were 40 bar hydrogen, WHSV=1 kg/l.h and a temperature of 345° C.

The dewaxed oil was distilled into a process oil fraction (Process oil 2) boiling having an initial boiling point as 466° C. and a 90 wt % boiling point of 567° C. The yield of process oil on waxy raffinate feed was 12.3 wt %. Other properties of the process oil are listed in Table 1.

TABLE 1

|  | Process oil-1 | Process oil-2 |
| --- | --- | --- |
| density at 20° C. | 837.0 | 831.5 |
| pour point (° C.) | +9 | −39 |
| kinematic viscosity at 40° C. (cSt) |  | 56.6 |
| kinematic viscosity at 100° C. (cSt) | 22.92 | 9.1 |
| VI | 178 | 139 |
| sulfur content (% w) | <0.001 | <0.001 |
| Flash point (° C.) (ISO 2592) | >300 | 276 |
| UV absorption at 300 nm (ASTM D 2008-Al) | <0.6 | <0.6 |
| Evaporation loss at 107° C. after 22 hours (ASTM D 972) | <0.05 | <0.05 |
| CN number (IEC 590) | Not measured | 18.6 |

I claim:

1. A composition comprising
   an ethylene-propylene-diene rubber component; and,
   a process oil having a kinematic viscosity at 100° C. greater than 8 cSt and a pour point of below 10° C. wherein the process oil is obtained by a process comprising:
   (a) hydrocracking/hydroisomerizing a feed comprising a Fischer-Tropsch synthesis product;
   (b) isolating from the product of step (a) a process oil precursor fraction; and,
   (c) dewaxing the process oil precursor fraction obtained in step (b) to obtain the process oil.

2. The composition of claim 1, wherein the process oil has a flash point of above 260° C. according to ISO 2592.

3. The composition of claim 1, wherein the UV adsorption of the process oil at 300 nm is less than 0.6% according to ASTM D 2008-A1.

4. The composition of claim 1, wherein the kinematic viscosity at 100° C. is greater than 9 cSt.

5. The composition of claim 1, wherein step (c) is performed by solvent dewaxing.

6. The composition of claim 1, wherein step (c) is performed by catalytic dewaxing.

7. The composition of claim 1, wherein between 25 and 65 wt % of the feed in step (a) boiling above 370° C. reacts per pass to a fraction boiling below 370° C.

8. The composition of claim 1, wherein the composition furthermore comprises a poly-olefin component.

9. The composition of claim 8, wherein the poly-olefin is polypropylene.

10. The composition of claim 1 wherein (c) further comprises separating a lower boiling fraction from the dewaxed product to produce the process oil.

11. A composition comprising an ethylene-propylene-diene rubber component;
polypropylene; and,
a process oil having a kinematic viscosity at 100° C. greater than 8 cSt and a pour point of below 10° C. wherein the process oil is obtained by a process comprising:
(a) hydrocracking/hydroisomerizing a feed comprising a Fischer-Tropsch synthesis product;
(b) isolating from the product of step (a) a process oil precursor fraction; and, (c) solvent dewaxing the process oil precursor fraction obtained in step (b) to obtain the process oil.

12. The composition of claim 11, wherein the kinematic viscosity at 100° C. is greater than 9 cSt.

13. A composition comprising
an ethylene-propylene-diene rubber component; and,
a process oil having a kinematic viscosity at 100° C. greater than 8 cSt and a pour point of below 10° C., and an evaporation loss at 107° C. during 22 hours of less than 0.05 wt % according to ASTM D 972, wherein the process oil is obtained by a process comprising:
(a) hydrocracking/hydroisomerizing a feed comprising a Fischer-Tropsch synthesis product;
(b) isolating from the product of step (a) a process oil precursor fraction; and,
(c) solvent dewaxing the process oil precursor fraction obtained in step (b) to obtain the process oil.

14. The composition of claim 13, wherein the process oil has a flash point of above 260° C. according to ISO 2592.

15. The composition of claim 14, wherein the UV adsorption of the process oil at 300 nm is less than 0.6% according to ASTM D 2008-A1.

16. The composition of claim 15, wherein the kinematic viscosity at 100° C. is greater than 9 cSt.

17. The composition of claim 16, wherein step (c) is performed by solvent dewaxing.

18. The composition of claim 16, wherein step (c) is performed by catalytic dewaxing.

19. The composition of claim 18, wherein the conversion in step (a) is between 25 and 65 wt %, based on the weight percentage of the feed boiling above 370 ° C. which reacts per pass to a fraction boiling below 370° C.

20. The composition of claim 19, wherein the composition furthermore comprises a poly-olefin component.

21. The composition of claim 20, wherein the poly-olefin is polypropylene.

22. The composition of claim 21 wherein (c) further comprises separating a lower boiling fraction from the dewaxed product to produce the process oil.

* * * * *